United States Patent [19]

Sprung

[11] Patent Number: 4,788,791
[45] Date of Patent: Dec. 6, 1988

[54] COOLING SYSTEM FOR GREENHOUSE STRUCTURES

[76] Inventor: Philip D. Sprung, c/o 1001, 10th Avenue S.W., Calgary, Alberta, Canada, T2R 0B7

[21] Appl. No.: 947,697

[22] Filed: Dec. 30, 1986

[51] Int. Cl.⁴ .............................................. A01G 9/00
[52] U.S. Cl. ........................................ 47/17; 47/26; 47/48.5; 52/97
[58] Field of Search .............. 47/17, 18, 26, 29, 48.5, 47/57.5

[56] References Cited

U.S. PATENT DOCUMENTS

| | | | |
|---|---|---|---|
| 1,936,732 | 11/1933 | Renard | 47/17 |
| 3,080,875 | 3/1963 | Bartlett | 47/17 |
| 3,165,110 | 1/1965 | Brooks | 47/17 |
| 4,077,158 | 3/1978 | England | 47/17 |
| 4,209,943 | 7/1980 | Moeller et al. | 47/59 |
| 4,430,828 | 2/1984 | Oglevee et al. | 47/17 |

Primary Examiner—Robert A. Hafer
Assistant Examiner—Charles H. Sam
Attorney, Agent, or Firm—Kenyon & Kenyon

[57] ABSTRACT

A cooling system for a greenhouse comprising a plurality of water pipes mounted over the exterior surface of the structure to carry water from a source, with water outlets in the pipes to enable water to spray over the exterior surface, and controls associated with the pipes to control and regulate the amount of water and duration of spray received by the exterior surface of the structure.

20 Claims, 5 Drawing Sheets

स4,788,791

COOLING SYSTEM FOR GREENHOUSE STRUCTURES

BACKGROUND OF THE INVENTION

This invention relates to a cooling system for greenhouse structures, and more particularly to such a system which cools the fabric and interiors of stressed fabric structures.

In my co-pending U.S. Pat. application Ser. No. 947,636, filed Dec. 30, 1986, I have described a structure for environmental control of plants grown within. The structure is a stressed fabric structure wherein the fabric is technically woven polyvinyl chloride coated polyester scrim with about a 95° light translucency. While such fabric is conductive to heat, when exposed to solar radiation in spring or summer conditions, it results in a tremendous build up of heat in the space within the structure. It is necessary to have a means to control this tremendous heat build up, since plants grown within the greenhouse may wilt or die if exposed to continued extreme conditions of heat. Because the environment within such a structure is virtually sealed, so that proper control of various factors of the environment within, such as temperature, relative humidity and carbon dioxide can be properly controlled, it is impractical to use fans, open windows or doorways or the like to assist in cooling the space within such structures.

It is therefore an object of the present invention to provide an efficient system for cooling the interior of such a stressed fabric structure. While the invention will be described in conjunction with such a stressed fabric structure of the type described and illustrated in my co-pending U.S. Patent application Ser. No. 947,636, filed Dec. 30, 1986, it is not intended to limit the invention to such a structure. Clearly the invention has application to cooling of other types of structures, whether of stressed fabric construction or otherwise, and whether for use as greenhouses or other otherwise.

SUMMARY OF THE INVENTION

According to the present invention there is provided a cooling system particularly well-suited for a stressed fabric structure having fabric held under tension between arched ribs. The cooling system comprises a plurality of water pipes mounted over the exterior surface of the structure to carry water from a source. Water outlets in the pipes are provided to enable water to spray over the exterior surface. Control means are associated with the pipes to control and regulate the amount of water and duration of the spray received by the exterior surface of the structure.

In a preferred embodiment temperature sensors are provided in the fabric in each section to monitor the temperature of the fabric. The sensors are associated with microprocessor means electronically associated with solenoid valves to actuate the water flow and spraying when the temperature of a section of the fabric exceeds a predetermined value. Other sensors monitor the mean ambient temperature within the structure. These sensors also are electronically associated with the microprocessor means to activate the water flow and spraying when the internal mean ambient temperature within the structure exceeds a predetermined value.

In another preferred embodiment of the invention, temperature control means are electronically associated with the microprocessor means for the space within the structure. The temperature control means comprise mist generation means. The mist generation means are positioned within the structure and operate to produce periodically a mist cloud over the plants in the space within the structure. The microprocessor means activates the mist generation means when the internal mean ambient temperature in the space within the structure exceeds a predetermined value or on a timed basis.

It will be understood from the foregoing that the external cooling system of the structure according to the present invention, either alone or in conjunction with the internal cooling system described above, is an effective and efficient way to cool the interior space of the structure. As well, this external cooling system also helps to keep the exterior surface of the structure dust free, further enhancing the translucency of the fabric and hence the amount of light being received by plants within the structure.

BRIEF DESCRIPTION OF THE DRAWINGS

These and other objects and advantages of the invention will become apparent upon reading the following detailed description and upon referring to the drawings in which.

Figure 1:
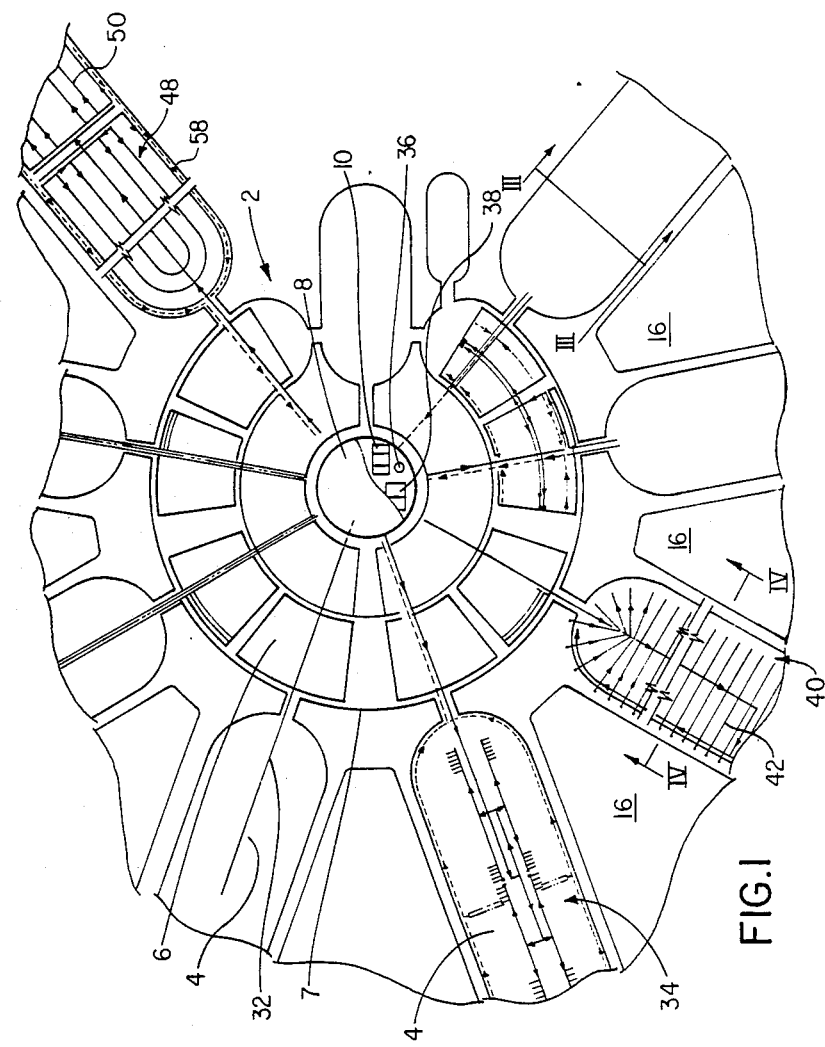
FIG. 1 is a partial schematic plan view of a greenhouse structure incorporating the external cooling system of the present invention, illustrating several control and monitor systems which may be incorporated in such structure.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

Figure 2:
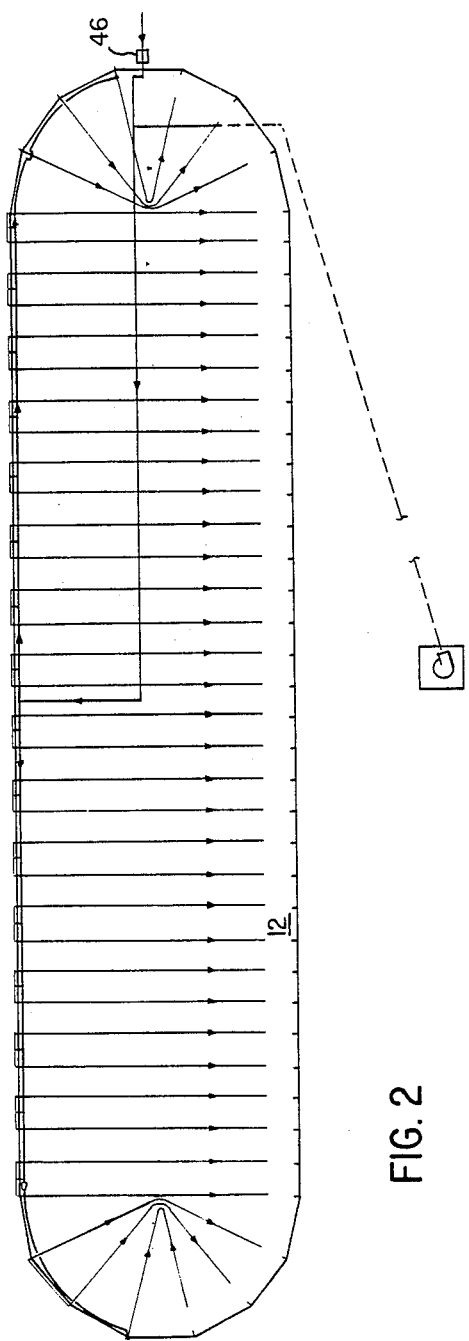
FIG. 2 is a schematic plan view of one of the elongated growing areas of FIG. 1, illustrating in more detail the external cooling system of the present invention.

Turning to FIGS. 1 and 2 there is illustrated a full schematic plan view and a partial schematic plan view, of a structure 2 incorporating an external cooling system in accordance with the present invention and showing many of the features of the structure which permit the control of environment within the elongated, radially positioned production areas 4 and immature crop development areas 6 in central annular corridor 7 of structure 2. Structure 2 has a central control area 8 where a microprocessor 10, the function of which will be described in more detail hereinafter, is located. Each production area 4 is connected as illustrated to central corridor area 7 and may be sealed from the corridor and other production areas, e.g. in case of infestations in that area 4.

The production and immature crop development areas 4 and 6 are enclosed by a translucent impermeable stressed fabric shell 12 (FIG. 3) situated on a base 14, the shell and base enclosing predetermined spaces (e.g. production areas 4 or immature crop development area 6). Shell 12 is preferably made of a technically woven polyvinyl chloride coated polyester scrim fabric, with about a 95% light translucency. Such a fabric is highly effective in providing natural light inside the structure and is heat conductive. The fabric is preferably lightweight (e.g. 18 ounces per square yard) and flame resistant, as well as resistant to oil, chemicals, greases, rot, mildew and certain types of bacteria which attack polyvinyl chlorides and which are prevalent in a moist environment. The shell 12 is made of sections, each of which is preferably held between arched rib members 15 which rest on the base, the rib members being spread to tension the fabric for example as described in my U.S. Pat. No. 4,137,687 issued Feb. 6, 1979.

Figure 3:
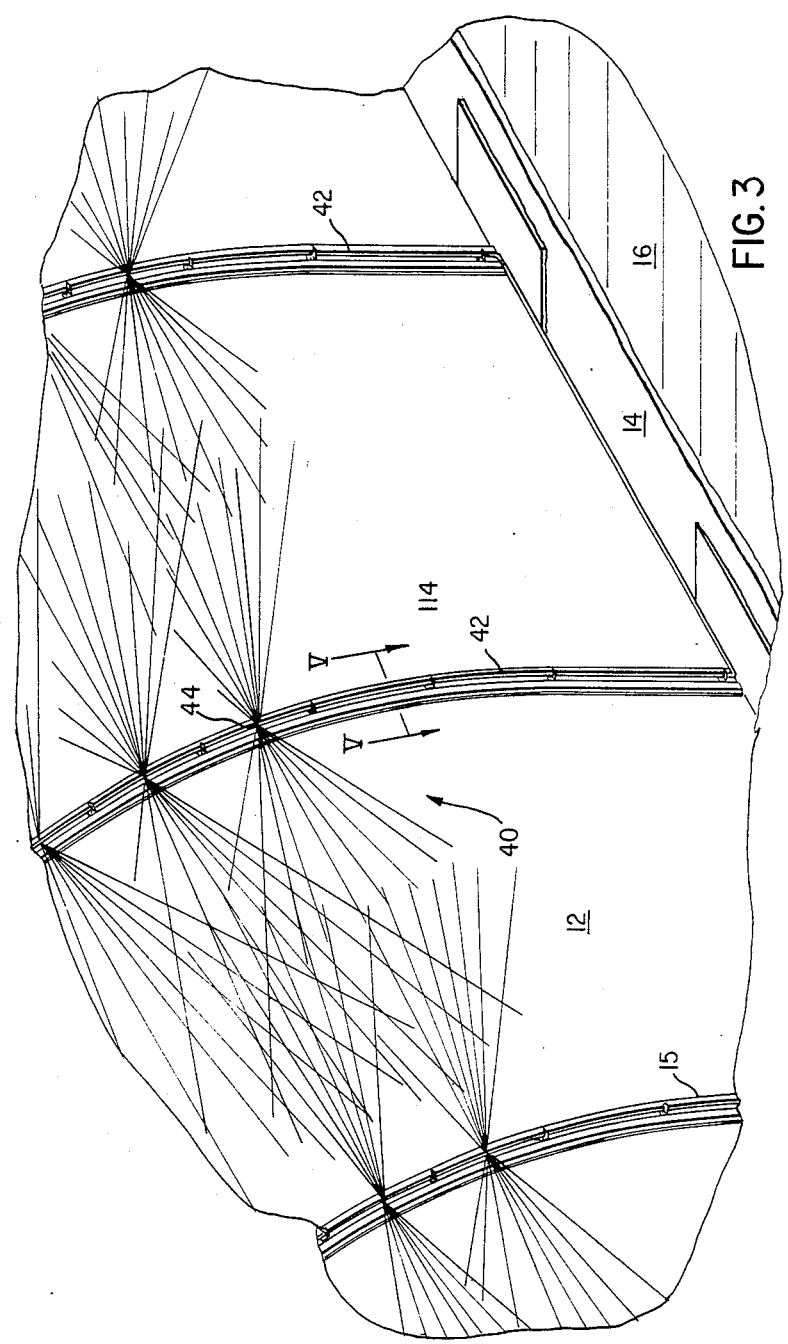
FIG. 3 is a partial, perspective view from the outside of the external cooling system in accordance with the present invention.

In addition, as can be seen in FIG. 3, the delivery of light to the interior of the structure is further enhanced by the fact that there are very few pipes, waterlines or other physical obstructions allowed above the growing root area. Also, illustrated in FIG. 4 base 14 for production area 4 is elevated and surrounded by reflective surface 16, which may be a light coloured surface e.g. of reflective plastic, or water ponds (as shown), ice surfaces (in below-freezing temperatures) or the like. In this manner, even when there is a low solar angle, light is transmitted by reflection, as well as directly, into the structure through shell 12. As can be seen in FIG. 3, the sides which make up shell 12 extend upward, from base 14, in convex fashion and meet at crest 18, forming two sides 20 and 22 for the shells of each of the elongated production areas 4.

The shells 12 extend over corresponding bases 14 of each of the areas illustrated in FIG. 1 to seal the environment within such areas against external environmental air conditions. This is important since it makes possible the close control of environmental conditions within each of the areas of the structure, such as humidity and carbon dioxide concentration. Otherwise, this would not be possible.

A series of temperature monitors 24 are provided for the interior atmosphere within each of the production areas 4 and immature crop development areas 6 in question (FIG. 3). As well, in the shell covering each of the areas 4 and 6 are embedded temperature sensors 30. Microprocessor 10, electronically connected to monitors 24 and 30, controls the temperature of shell 12 and the space within shell 12, as will be described in more detail hereinafter.

The temperature within each of the production areas 4 and immature crop development areas 6 is controlled, in part, by external spray system 40 consisting of a series of pipes 42 supplying water which may be, for example from a source (not shown) in central control area 8 or from ponds 16, and feeding the water through these pipes to spray nozzles 44 (FIG. 3) to spray a thin film of water over the exterior surface of shell 12 to cool it as required. To achieve this end the water is first sprayed from nozzles 44 through the air and onto the exterior of shell 12 into a dispersed pattern as illustrated. This spraying through the air provides for evaporative cooling of the water, thereby supplying additional cooling potential to shell 12. Sensors 30 in shell 12 are electronically connected to microprocessor 10 and, either on a timed sequence or as the temperature of the shell builds up to a certain range, it activates solenoid valves 46 (FIG. 2) to cause water to be sprayed through nozzles 44 over exterior surface of the shell to cool it. The shape of shells 12 over production areas 4 and immature crop development areas 6 is such that this water film will run down the exterior surface of the shells. Nozzles 44 are preferably directed to provide an even spray over most of the exterior surface of shell 12 over production areas 4 and 6, as required. Water so sprayed over shells 12 may be collected, for example, in the external ponds 16 forming the reflective surface, or by any other appropriate retrieval means.

Figures 5, 6:
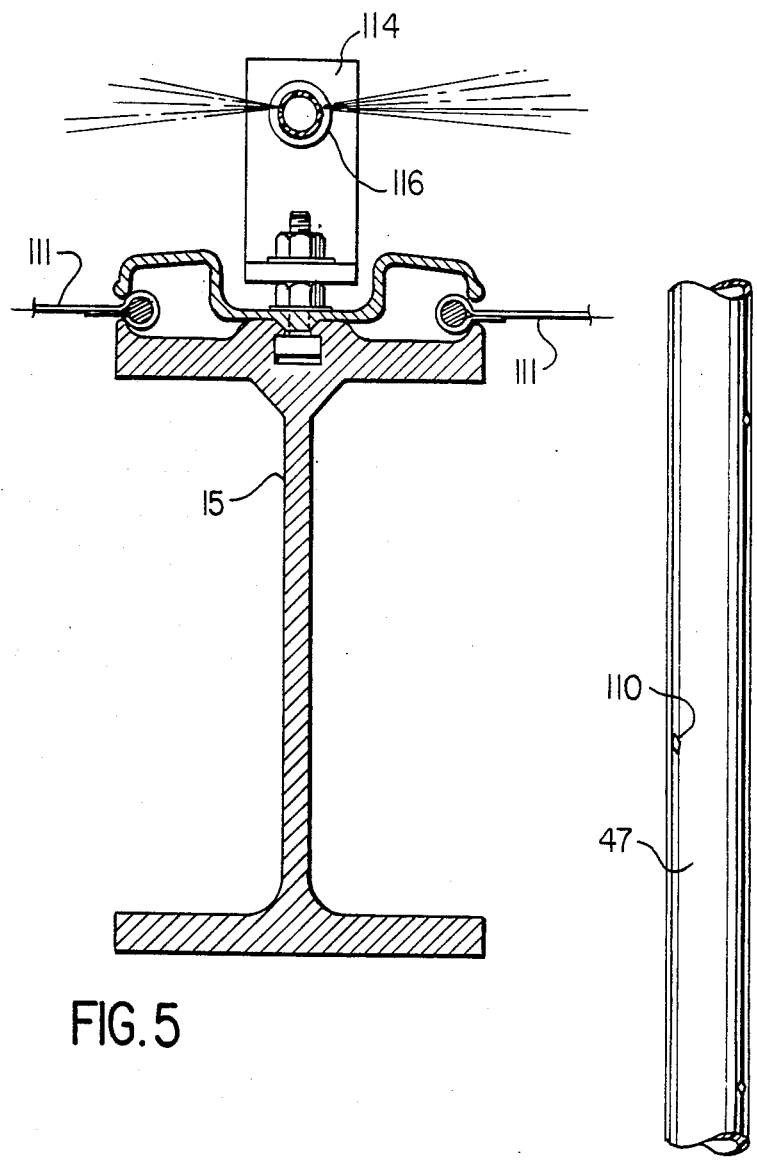
FIG. 5 is a partial section view along line V—V of FIG. 3, illustrating the manner in which the external cooling system is clamped to the structure.
FIG. 6 is a partial view of a pipe supplying water for the external cooling system in accordance with the present invention.

As can be seen in FIG. 6, the nozzles 44 in pipes 42 may simply be diamond-shaped holes 110 punched along the pipe, for example, off-centre opposite to each other (FIG. 5). When water is supplied under adequate pressure, it covers the surface area of the fabric in a flat spray, extruding the distance between the ribs 15, to which ribs the edges of the stressed fabric sections 111 are secured (FIG. 5). This spray also comes in contact with the ribs, which are usually made of aluminum, to cool them. Pipes 42, for example, may consist of a one-half inch diameter polyvinyl chloride pipes complete with ultraviolet inhibitors. The pipes are mounted, preferably, on each rib 15 of the structure (see for example FIG. 2 for a suitable system layout of pipe 42). Pipes 42 are fastened to corresponding ribs 15 using a special bracket 114 made, for example, of an aluminum angle. These brackets 114 each contain an oversized hole 116 for the pipe to run through. This hole allows for expansion and contraction of pipe 42. Otherwise the pipe would twist completely out of shape during heating and expansion encountered during normal conditions.

The operation of this external spray system 40 may alternatively or additionally controlled by a timer associated with microprocessor 10. The timer or temperature sensor 30 dictates the operation of the system 40, based on weather conditions, inside temperature and fabric temperature. The timer means controls and regulates the amount of water and duration of spray, the external surface of the structure, or each section thereof, would receive. The sensors 30 monitor both the skin temperature of shell 12 and the mean ambient temperature inside the structure. The sensors are monitored by microprocessor 10 which controls valve means 46 operating the flow of water through pipes 42. When either or both temperatures exceed a set limit, then the system is turned on.

It will be understood that the external spray system 40 cools in several ways:
(1) The cooler temperature of water passed through pipes 42 is transferred into the fabric and maintained, if not lowered, while the water evaporates off the fabric of the structure. This cooling effect is in turn transferred into the interior of the structure thereby reducing the latent heat load.
(2) The water spray on the ribs 15 cools them to a point that no heat is transferred into the interior of the structure. Instead, they absorb heat from inside the structure and transmit it outside.
(3) The evaporation and cool up-draft from ponds 16 creates a cooler surrounding around the structure 2. This cool air in turn draws the heat away from the structure and further reduces the internal temperature.

Figure 4:
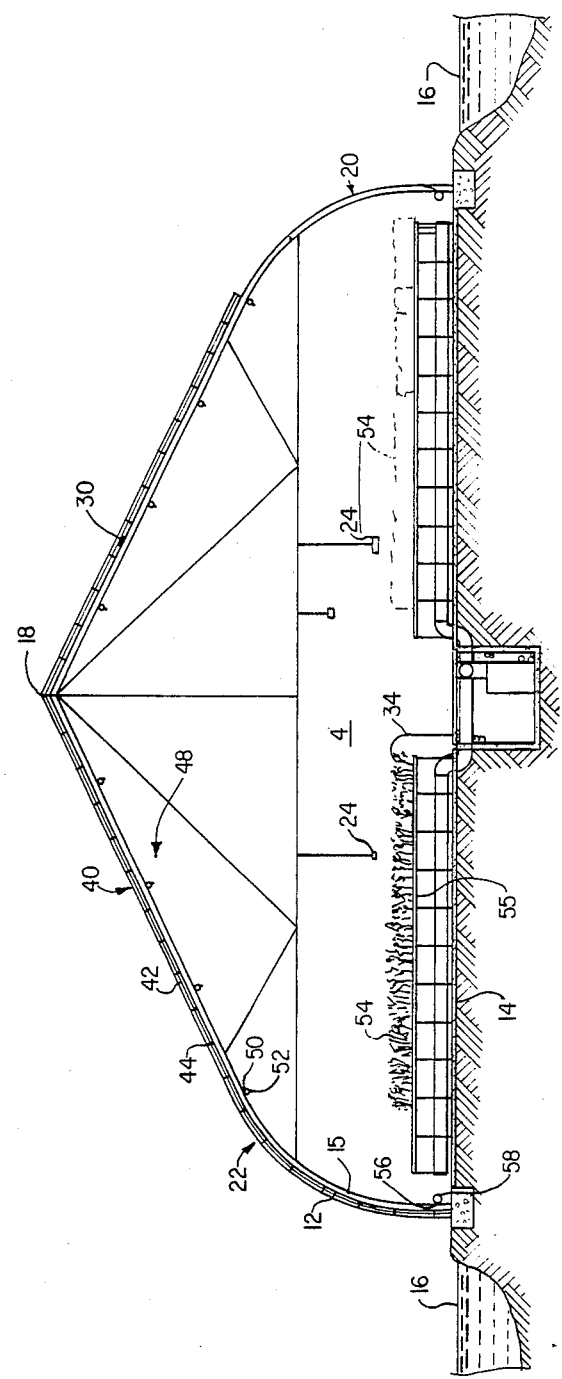
FIG. 4 is an elevation section view along line IV—IV of FIG. 1.

Internally, temperature control is also achieved through internal mist generation system 48 (FIG. 4) which comprises water supply pipes 50 feeding fog nozzles 52, which nozzles produce, as required, a fine mist or vapour cloud in the atmosphere in the space over plants 54 (FIG. 4). This internal mist generation supply system is activated by temperature monitors 24 electronically connected to microprocessor 10, which microprocessor activates the internal mist generation supply system when the temperature within the immature crop development or production area exceeds a predetermined level, or on a timed sequence. The production of the mist or cloud facilitates cooling in several ways. Firstly, it impedes the passage of rays of sunlight to the plants, thereby cooling by shading. Secondly, as the mist or cloud evaporates under the heated conditions within the shell, the evaporation draws heat from the environment in the space in the shell. The evaporated water vapour condenses on the cooler shell surface (cooled if necessary by external vapour system 40), passing the heat of condensation into the shell fabric. The shell fabric is of a heat conductive material and heat is thereby passed from the internal to the external side of the shell and out of the internal environment of production area 4 or immature crop development area 6. Also the temperature differention between fabric and internal air because of the extenal spray system enhances the internal convective air transfer to the fabric, which increase the condensation of water vapour onto the skin, thus further reducing the latent heat load in the structure.

Water vapour thus condensing on the interior surface of shell 12 (which may include water vapour from transpiration of the plants 54) travels down the sides of the shell and is collected by means of collection skirts 56 passing into slots 57 in collection pipes 58 (FIG. 4), collection pipes 58 returning this condensed water to a central location where it may be used as required, preferably being mixed with nutrient in tanks 38. This system thus acts as a large scale water distillation system, the water received by the plants in solution with the nutrient having been purified by means of this distillation process.

As well, as one can imagine, one of the problems of adapting a greenhouse structure in which the internal environment is sealed against external environmental air conditions, when applied to large scale production from crops within the greenhouse, is the build up of water vapour in the air. This build up results from transpiration from the plants. If it is permitted to continue unchecked, the relative humidity in the greenhouse structure will build up to the point that transpiration of the plants is significantly impeded. As plants require transpiration for example to cool their leaves and to draw nutrient solution through the plant system, the growth of the plant is thus adversely affected. While the structure could be opened to the outside environment to permit the humidity which has become built up within the structure to escape, this may create unwanted temperature differentials within the greenhouse structure and be quite impractical, for example in winter conditions. It will be readily understood, therefore, that the condensation of water vapour on the interior surface of shell 12 and the removal of that condensed water by means of collection skirts 56 and collection pipes 58 helps to control the humidity conditions within the greenhouse structure so that proper transpiration of the plants is continuously permitted without requiring the greenhouse structure to be opened up to the outside environment.

Because of the computerized control of the various aspects of the internal environment in production areas 4 and immature crop development areas 6, temperature may be adjusted to suit the particular type of plant being grown or the stage of growth of that plant. The microprocessor 10 may be appropriately programmed to modify the temperature and other environmental conditions within the shell 12 for the plants over the life of the plants, to ensure optimum plant growth. As well, it is preferred to provide an appropriate alarm signal so that when such environmental conditions exceed a desired range for proper plant growth, the alarm will sound and, if required, a manual override and manual adjustment of such conditions may take place.

Thus it is apparent that there has been provided in accordance with the invention a cooling system for greenhouse structures that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. In a stressed fabric structure having fabric held under tension between ribs, the improvement characterized by a cooling system which comprises a plurality of water pipes mounted over the exterior surface of the structure to carry water from a source, the exterior surface being composed of a plurality of sections, water outlets in the pipes to enable water to spray over the exterior surface, control means associated with the pipes to control and regulate the amount of water and duration of spray received by the exterior surface of the structure, the control means arranged to control and regulate individually for each section the amount of water and duration of spray received by the exterior surface of each section, the control means comprising valves in the pipes to control the flow of water through the pipes, temperature sensors in the fabric in each section, and a microprocessor means which is electronically associated with the temperature sensors and the valves to actuate the water flow and spraying when the temperature of a section of the fabric exceeds a predetermined value.

2. A structure according to claim 1 further provided with sensors to monitor the mean ambient temperature within the structure, the sensors also being associated with the microprocessor means to activate the water flow and spraying when the internal mean ambient temperature within the structure exceeds a predetermined value.

3. A structure according to claim 1 further provided with timer means electronically associated with said microprocessor means to control and regulate the amount of water and duration of spray each section of the structure receives.

4. A structure according to claim 1 wherein the pipes are carried in brackets attached to the ribs.

5. A structure according to claim 1 wherein the water outlets are holes punched in the pipe.

6. A structure according to claim 5 wherein the holes are diamond shape and are aligned along opposite sides of the pipe off-centre from each other, whereby the water covers the external surface area of the fabric in a flat spray extending to adjacent ribs.

7. A structure according to claim 1 wherein the water source comprises water ponds situated beside the structure.

8. A structure according to claim 7 wherein the structure is provided with water collection means to return water sprayed on the external surface of the structure to the ponds.

9. A structure according to claim 1 wherein the control means associated with the pipes includes water pressurizing means whereby the pressure of the water is increased to about 1,000 p.s.i. before it is passed through the water outlets in the pipes.

10. A structure according to claim 1 wherein the fabric is technically woven polyvinyl chloride coated polyester scrim with about a 95° light translucency.

11. A structure according to claim 1 wherein the structure has convex sides extending upwardly to a central peak, the spray means being mounted to spray water in a film over the external surface and down both sides of the structure.

12. A structure according to claim 11 further comprising temperature monitor and temperature control means for the space within the structure, the microprocessor means being electronically associated with the temperature monitor and control means, and the temperature control means comprising mist generation means positioned within the structure and operable to produce a mist over the plants in the space within the structure, the microprocessor means to activate the mist generation means for temperature cooling when the internal mean ambient temperature in the space within the structure exceeds a predetermined value.

13. A structure according to claim 1 wherein the fabric is technically woven polyvinyl chloride coated polyester scrim with about a 95° light translucency, and wherein the structure is provided with temperature monitor and temperature control means for the space within the structure, the temperature monitor means being associated with microprocessor means electronically associated with the temperature control means, and the temperature control means comprising cooling means consisting of mist generation means positioned within the structure and operable to produce a mist over plants within the structure, the spraying of water over the exterior surface of the structure cooling the structure so as to cause water vapour in the space within the structure to condense on the interior surface of the structure, the microprocessor means to activate the temperature cooling means when the internal mean ambient temperature in the space within the structure exceeds a predetermined value.

14. A structure according to claim 13 wherein the mist generation means comprises a plurality of fog nozzles and a water source for supplying water to the fog nozzles.

15. A structure according to claim 14 further provided with means to collect water condensing on the interior surface of the structure for purposes of recycling it for use within the structure.

16. A structure according to claim 1 wherein the cooling system further comprises temperature monitor and temperature control means for the space within the structure, the temperature monitor means being associated with microprocessor means electronically associated with the temperature control means, and the temperature control means comprising cooling means consisting of mist generation means positioned within the structure and operable to produce a mist over plants within the structure, the spraying of water over the exterior surface of the structure fabric cooling the structure fabric so as to cause water vapour in the space within the structure to condense on the interior surface of the structure fabric, the microprocessor means to activate the external water flow and/or the mist generation means as required when the internal mean ambient temperature in the space within the structure exceeds a predetermined value.

17. In combination,
 a stressed fabric structure including a translucent impermeable stressed fabric shell enclosing predetermined spaces for crop development in sealed relation against external environmental air conditions, said shell having a plurality of sections, each said section being disposed between a pair of arched rib members;
 an external spray system for spraying a thin film of water over selected shell sections to cool said sections;
 a plurality of temperature sensors, each said sensor being disposed in a respective one of said shell sections and communicating with said spray system for actuating said spray system to spray water onto a respective shell section in response to a sensed temperature of said respective shell section;
 an internal mist generation system for producing a mist in a selected predetermined space; and
 a plurality of temperature monitors, each said monitor being disposed in a respective one of said predetermined spaces and communicating with said mist generation system to produce a mist in a respective space in response to a monitored temperature in said respective space exceeding a predetermined level.

18. The combination as set forth in claim 17 which further comprises a pond adjacent said fabric structure for collecting water from said shell sections.

19. The combination as set forth in claim 17 which further comprises water collection pipes within said fabric structure for collecting water condensing on inside surfaces of said shell sections.

20. The combination as set forth in claim 17 which further comprises a microprocessor connected to said sensors, monitors, external spray system and internal mist generation system for controlling said systems in response to the sensed and monitored temperatures to adjust the temperature of said predetermined spaces.

* * * * *